United States Patent [19]

Pensabene et al.

[11] 4,139,423
[45] Feb. 13, 1979

[54] SINTERED NEGATIVE PLATE

[75] Inventors: Saverio F. Pensabene; Arthur J. Catotti, both of Gainesville, Fla.

[73] Assignee: General Electric Company, Gainesville, Fla.

[21] Appl. No.: 894,398

[22] Filed: Apr. 7, 1978

[51] Int. Cl.$^2$ .......................... C25D 9/06; C25D 9/08
[52] U.S. Cl. ..................................................... 204/2.1
[58] Field of Search ................ 204/2.1; 427/437, 126, 427/380

[56] References Cited

U.S. PATENT DOCUMENTS

| | | | |
|---|---|---|---|
| 3,663,296 | 5/1972 | Nervik | 427/437 |
| 3,679,481 | 7/1972 | Pinard | 427/126 |

Primary Examiner—T. M. Tufariello

[57] ABSTRACT

A process for manufacturing electrodes for nickel-cadmium alkaline storage cells consisting essentially of the steps of forming a porous nickel plaque, immersing the plaque in a slightly acidic-cadmium nitrate solution, removing the plaque from the solution and heating the plaque in air until dry, immersing the dried plaque in an alkali hydroxide solution, removing the plaque from the hydroxide solution and rinsing the plaque with water, reheating the plaque in air until substantially dry, repeating the foregoing treatments until the desired electrochemical loading in the plaque pores is attained, heating the plaque with the desired electrochemical pore loading to a temperature of between about 200° C. and 300° C. until substantially all of the Cd (OH)$_2$ in the plaque is converted to CdO and nitrate impurities in the plaque are converted to nitrogen oxide gases and volatilized, immersing the plaque with the converted CdO in a second alkali hydroxide solution, cathodizing and then anodizing the plaque in the second solution, removing the cathodized and anodized plaque from the second solution, rinsing the plaque with water and heating the rinsed plaque until the plaque is substantially dry.

7 Claims, No Drawings

SINTERED NEGATIVE PLATE

This invention relates to a process for the preparation of storage battery electrodes and, more particularly, for the preparation of such electrodes for nickel-cadmium alkaline storage cells.

The ability of storage batteries to accept a charge and retain such charge when not in use is of substantial importance. Depending upon the duty cycle of the system in which the battery is to be employed, the time interval over which the battery might be required to retain its charge might vary. Generally, however, the longer the charge retention time, the more desirable the cell. Thus, the shelf life is longer for a battery with longer charge retention than a battery with shorter charge retention.

It has long been recognized that nitrate ion contamination is one of the factors which adversely affects the charge retention capability of nickel-cadmium alkaline storage cells, accelerates loss of charge and shortens the charge retention time thereof. The precise nature of the action which causes loss of charge or discharge when nitrate ions are present is not considered of importance to the instant invention but is believed to involve some form of oxidation-reduction of the ions at the cell plates. Where the electrolyte available in the cell is limited such as in the nickel-cadmium cell, such nitrate ion reaction lowers cell charge retention time substantially.

Attempts, heretofore, to lower the nitrate ion content of nickel-cadmium alkaline storage cells have been directed toward inhibiting the attack of impregnating solutions on the sintered porous nickel carrier as such carrier is being treated to form the cadmium compound containing negative electrode. Such attempts have generally been directed to the addition of organic or inorganic additives to the solution, have met with only limited success and involve the risk of introducing impurities into the active material which might cause other problems.

In the instant invention it has been discovered that the nitrate ion level in nickel-cadmium alkaline cells can be lowered, substantially, without additives by treating the composite in the make up of the negative electrode or plate in a particular manner as such composite is formed. Such treatment substantially reduces, if not eliminates, the nitrate from the negative plate material. This is accomplished, in the instant invention, by heating the composite under prescribed conditions after the composite has been built to the desired electrochemical capacity and before such composite undergoes initial electrochemical reaction. Immediately after such heating and without rehydration, the composite negative plate material is electrochemically reacted in an alkali hydroxide solution, immersed in water, heated in air until dry and is then cut into finished negative plate size. As compared to retention capacity of nickel-cadmium cells made by conventional processes, the retention capacity of cells produced by the instant process are about doubled. The nitrate is removed from the composite. Charging efficiency and charge retention is improved.

In the process of the invention a porous nickel carrier is prepared in conventional manner, such as by electrodeposition, cathodic impregnation or conventional impregnation. Preferably, a porous nickel plaque is prepared by sintering and is then loaded with electrochemically active cadmium hydroxide by immersing the metal plaque in cadmium nitrate, slightly acidified with nitric acid. The metal plaque is then heated in air until dry and immersed in alkali hydroxide solution, preferably sodium hydroxide, rinsed in water and again heated in air until dry. The foregoing steps are repeated until the desired hydroxide loading is attained.

After the porous nickel plaque has been loaded in conventional manner to the desired level with the hydroxide, the loaded plaque in the process of the instant invention is heated in air to a temperature not substantially less than 200° C. and not substantially more than 300° C. until the $Cd(OH)_2$ in such plaque is converted to CdO and the nitrate impurities are converted to nitrogen oxide gases and volatilized. Once all of the cadmium hydroxide has been converted to CdO, the temperature can be raised to between about 400° C. and 500° C. to convert any $Ni(OH)_2$ to NiO and volatilize any nitrates remaining in the plaque. The maximum temperature during such treatment is limited by the vapor pressure of the cadmium compounds.

After the loaded plaque has been heated, the $Cd(OH)_2$ converted to CdO and the nitrate impurities have been converted to nitrogen oxide gases and driven off, the heat treated loaded plaque is immersed in an alkali hydroxide solution, preferably sodium hydroxide while being cathodized. Annodization immediately follows this cathodization. Next, the material is rinsed in water to remove excess hydroxide solution, removed from the water and heated, until dry, and is then cut into the required battery plate size.

The immersion of the heat treated loaded plaque into the alkali hydroxide solution, with cathodization and anodization, immediately after the conversion of the $Cd(OH)_2$ to CdO and the volatization of the nitrate impurities and without an intermediate step of immersion of the plaque into water and heating of the plaque until dry, as heretofore suggested, has distinct advantages. Because of the CdO particles are more conductive and more dense than the $Cd(OH)_2$ particles formed when the plaque in the prior process was immersed in water and then heated until dry, subsequent charging of the CdO particles in the plate of the process of the instant invention is more efficient. Penetration of the electrolyte into the plate structure is greater and charging is more complete.

Negative plate plaques prepared by the prior art process and by the process of the instant invention, were built with positive plates and separators into cells of ⅓ AA design and were separated and tested in cell groups.

The prior art process plaques were prepared by following the conventional nickel cadmium battery plate-making process. The sintered nickel plaque was loaded with electrochemically active metal hydroxides by the following sequence of steps:

(a) Immersing of the sintered nickel plaque in cadmium nitrate solution;
(b) Heating the plaque in air until substantially dry;
(c) Immersing the dried plaque in sodium hydroxide solution;
(d) Immersing the plaque in water;
(e) Heating the plaque in air until substantially dried; (Steps a–e are repeated, in seriation, until the desired electrochemical capacity of the plaque is attained)
(f) The plaque with the desired electrochemical capacity, is immersed in sodium hydroxide, cathodized and anodized;
(g) Immersing the plaque in water.
(h) Heating the plaque in air until substantially dry;

(i) The dried plaque is cut into plate size and assembled in conventional manner, with separators, positive plates and the conventional components into ⅓ AA design cells.

The plaques prepared in accordance with the process of the instant invention were prepared by loading the sintered nickel plaque with the desired electrochemical capacity by repeating, in seriation, steps a–e, supra, until the desired capacity was attained. After the desired electrochemical capacity had been attained, the plaques processed in accordance with the instant invention were processed, as follows:

(1) The plaques were heated to a temperature between 220°–300° C. and the $Cd(OH)_2$ was converted to CdO.

(2) After conversion of substantially all of the $Cd(OH)_2$ into CdO, the heating temperature was raised and maintained at a temperature between 400°–550° C. and the $Ni(OH)_2$ remaining in the plaque was converted to NiO and the nitrates driven off as a gas.

The plaque with the converted CdO and substantially all of the nitrate removed was immersed in sodium hydroxide, cathodized and anodized, immersed in water, heated in air until substantially dry and then cut into plate size. The plates were then assembled in convention manner, with separators, positive plates and other conventional components into ⅓ AA design cells.

The cells assembled with negative plates processed, aforesaid, in the conventional manner and the cells assembled with the negative plates processed in accordance with the present invention (Modified Cells), were charged in conventional manner, separated into groups and comparison tested. The cells tested were built with polypropylene separators and utilized 31% KOH electrolyte. The cell groups were tested in the following sequence of tests:

Table I

1. Charged at 10 mA for 16 hours at room ambient.
2. Discharged at 200 mA to 1.0V cutoff.
3. Discharged through 1 ohm resistor for 29 hours.
4. Open circuit stand to screen out cells with poor voltage recovery.
5. Tabbed both terminals of each good cell.
6. Soldered 120 K ohms or 12K ohms load resistors to tabs.
7. Recharged at 10mA for 48 hours.
8. Placed cells in forced air ambient at 45° C.
9. Measured cell voltages during stand at 45° C.

The results of such tests of such ⅓ AA design cells are tabulated in Table II, infra., as the number of days at 45° C. during which the cell voltages were greater than 1.1V.

Table II

| Load Resistor Process Group | Retention Test Results Days at 45° C greater than 1.1V | |
|---|---|---|
| | 12K ohms | 120K ohms |
| Conventional cells | 19 | 30 |
| Modified Cells | 29 | 72 |

A further comparative sets of tests were carried out on the conventional and modified cells in accordance with the following procedure:

Table III

1. Charged for 20 hours at room ambient.
2. Open circuit rest for 1 to 4 hours at room ambient.
3. Discharged until cell voltage reached 0.6V.
4. Repeated 1 to 3 until amperehours discharged in step 3 showed little or no charge with repetition of steps 1 to
3. This usually required 10 to 40 repetition.
5. Repeated step 1.
6. Stored open circuit at rest temperature for 0 to X days.
7. After various periods of storage 6 to 24 cells of various sizes were removed from the test ambient and allowed to equilibrate to room ambient before being discharged.
8. Then step 3 was repeated.
9. The amperehours in step 8 were divided by the stabalized capacity in step 4 and represent the % of the room ambient stabilized capacity retained at test ambient. For each cell in each group an average was calculated for each storage period. From this average the loss for each storage period was calculated. The average loss for all the storage periods is tabulated in Table IV as percent loss per day at test ambient temperature.

Table IV

| Cell Type | Retention Test Results | | | | |
|---|---|---|---|---|---|
| | Conventional | | | Modified | |
| Test Temperature | 24° C | 48° C | 37° C | 48° C | 60° C |
| % Loss Per Day | 1.82 | 10.2 | 1.31 | 3.10 | 9.58 |

As can be seen from the foregoing tests, the charge retention in cells with negative plates prepared by the process of the instant application are superior to the retention of conventional cells.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

We claim:

1. A process for the manufacture of negative electrodes for nickel-cadmium alkaline storage cells the steps consisting essentially of forming a porous nickel plaque, immersing said porous plaque in a slightly acidic cadmium nitrate solution, removing said plaque from said nitrate solution and heating said plaque in air until substantially dry, immersing said dried plaque in an alkali hydroxide solution, removing said plaque from said hydroxide solution and rinsing said plaque with water, reheating said plaque in air until substantially dry, repeating the foregoing treatments of said plaque until a desired electrochemical loading in the pores of said plaque is attained, heating said plaque with said desired electrochemical loading to a temperature not substantially less than 200° C. and not substantially more than 300° C. until substantially all of the $Cd(OH)_2$ in said plaque is converted to CdO and nitrate impurities in said plaque are converted to nitrogen oxide gases and volatilized, immersing said plaque with said converted CdO in a second alkali hydroxide solution, cathodizing and then anodizing said plaque in said second solution, removing the cathodized and anodized plaque from said second solution and rinsing said plaque with water and heating said plaque until said plaque is substantially dry.

2. A process as recited in claim 1 in which said alkali hydroxide solution is sodium hydroxide.

3. A process as recited in claim 1 in which said plaque is heated to a temperature of not substantially less than 400° C. and not substantially more than 500° C. to convert any $Ni(OH)_2$ therein to NiO after said $Cd(OH)_2$ in said plaque has been converted to CdO.

4. A process as recited in claim 3 in which said alkali hydroxide solution is sodium hydroxide.

5. A process for removing nitrate impurity from negative electrodes for use in nickel-cadmium alkaline storage cells as such negative electrode is being formed, the steps comprising loading the pores of a porous nickel plaque with electrochemical active negative electrode material until the desired loading of such pores is attained, heating said electrochemical loaded plaque to a temperature not substantially less than 200° C. and not substantially more than 300° C. until substantially all of the $Cd(OH)_2$ in said electrochemical material is converted to CdO and the nitrate in said material is converted to nitrogen oxide gases and volatilized, immersing said plaque with said converted CdO in an alkali hydroxide solution and cathodizing and anodizing said plaque in said solution, removing the cathodized and anodized plaque from said solution and rinsing said plaque with water and heating said rinsed plaque until said plaque is substantially dry.

6. A process as recited in claim 5 in which the temperature at which said plaque is heated to convert the $Ni(OH)_2$ to NiO and converts the nitrate to nitrogen oxide gases and are driven off is increased to a temperature of not substantially less than 400° C. and not substantially more than 500° C. after said $Cd(OH)_2$ is converted to CdO.

7. A process as recited in claim 6 in which said alkali hydroxide solution is sodium hydroxide.

* * * * *